United States Patent [19]

Lindner et al.

[11] 4,086,958
[45] May 2, 1978

[54] HEAT EXCHANGE METHOD AND APPARATUS INCLUDING TWO NON-MIXABLE MEDIA

[75] Inventors: Friedrich Lindner, Stuttgart; Frank Mehlhorn, Weinstadt, both of Germany

[73] Assignee: Deutsche Forschungs- und Versuchsanstalt fur Luft- und Raumfahrt e.V., Bonn, Germany

[21] Appl. No.: 769,735

[22] Filed: Feb. 17, 1977

[30] Foreign Application Priority Data

Feb. 21, 1976 Germany .................... 2607168

[51] Int. Cl.² ............................................ F28D 21/00
[52] U.S. Cl. ............................. 165/104 S; 165/111; 62/59; 126/400
[58] Field of Search .................. 165/104 S, 111; 126/400; 62/59, 430

[56] References Cited

U.S. PATENT DOCUMENTS

| 2,856,506 | 10/1958 | Telbes | 126/400 X |
| 2,996,894 | 8/1961 | Shade | 165/DIG. 4 |
| 3,991,936 | 11/1976 | Switzgable | 126/400 X |

*Primary Examiner*—Albert W. Davis, Jr.
*Attorney, Agent, or Firm*—Lawrence E. Laubscher

[57] ABSTRACT

Heat exchange method and apparatus are disclosed which include the use of two non-mixable media of different temperatures that are brought in direct contact with each other to effect the transfer of heat from the heating medium to the heat storage medium. One of the media is normally a fluid and the other is preferably a substance — such as a crystalline material — which is operable between solid and liquid phases, whereby the latent heat produced by the phase transition is utilized in the heat exchanging process. Owing to the non-mixability of the two media, the first medium is bubbled through the second in direct heat exchanging contact when the second medium is in the liquid phase. A supply conduit including a submerged perforated portion is used to introduce the first medium within the second, an imperforate by-pass conduit being also provided for conveying the first medium in heat transfer relation through the second medium when the supply conduit is clogged by the second medium when it is in its solid phase.

9 Claims, 8 Drawing Figures

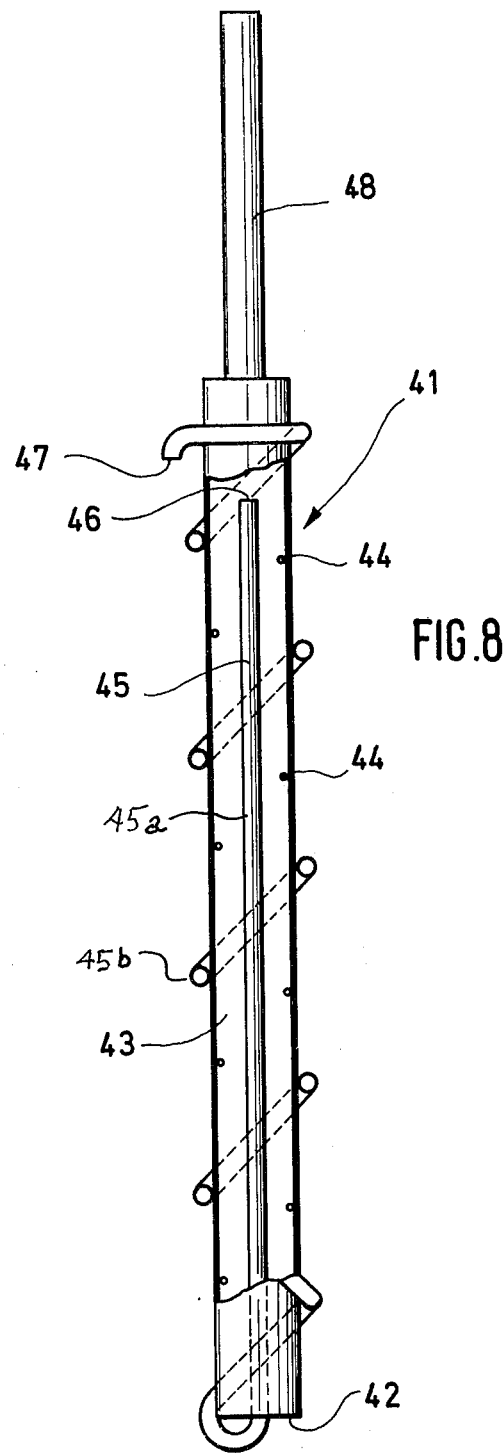

HEAT EXCHANGE METHOD AND APPARATUS INCLUDING TWO NON-MIXABLE MEDIA

BRIEF DESCRIPTION OF THE PRIOR ART

Heat exchangers are well known in the prior art for the exchange of heat between two media which have different temperatures and which may, independently of each other, have both liquid and gaseous states. To effect the desired good heat conductivity, heat exchangers are generally made of metal and, as a rule, they are so shaped that both media come into close contact with metallic heat exchanger surfaces through which the energy transfer takes place, but which prevent direct contact of the two media with each other. Radiators for heating purposes, motor vehicle radiators, gas passage heaters, or the like, are constructed according to this principle. A heat exchange also takes place in the so-called latent heat storage reservoirs in which the phase transfer of a crystalline substance causes the melting heat to be exchanged. Because in this case the medium storing the energy is present at least partly in a solid phase, the heat-exchanging metal surfaces must be adapted correspondingly and this frequently creates a problem because the crystallizing storage unit materials as a rule are poor heat conductors and because a heat exchange process, taking place over a predetermined volume area, is rather difficult to accomplish. In latent heat reservoirs, the reservoir substances in the discharged state are presently mostly in a compact, conglomerated solid form so that a thorough mixing for the improvement of heat transfer is not possible.

In the case of latent heat reservoirs an attempt was therefore made to solve the problems described by permeating the storage volume, taken up by the storage substance, with a metal structure, for example, a pipe or thin plate system, through which a heat-exchanging liquid will flow. But this leads to higher costs, heavier weight, and larger volumes as a result of which the advantage of high "energy density" of the storage unit is extensively lost. It has also been proposed in the case of latent heat reservoirs to use a tank which becomes conically wider toward the bottom, which will permit the solid, crystallized storage medium to keep sliding during the charging process, during which heat, for example, is given off by the liquid medium through the metal base plate. Here the material, which is melted on the bottom is pressed upward in the tank through a previously melted duct.

In both storage systems, however, there exist drawbacks at least in connection with heat removal because the storage substance always is first solidified along the contact surfaces and forms a heat retaining layer which makes it difficult to obtain heat exchange with the volume area located behind this layer. To some extent there is even a separation of the solidified layer from the metal contact surface of the heat exchanger, due to a volume contraction, as a result of which heat transfer is practically stopped.

SUMMARY OF THE INVENTION

To solve the problems described, it is the purpose of the present invention to provide a method and apparatus for the exchange of heat between two media having different temperatures which can be used particularly in connection with latent heat reservoirs, and where a metal heat transfer layer is not required in separating relation between the two media.

The problem is solved according to the invention in that direct mutual contact is established between two media which in practice cannot be mixed with each other, for the purpose of heat exchange, the media being separated from one another on the basis of their non-mixability after the heat exchange has been completed.

Accordingly, a primary object of the invention is to provide a heat exchange method and apparatus including two media that are non-mixable and at different initial temperatures, one medium being a fluid and the other being operable as a function of temperature between solid and liquid phases, whereby the first medium may be bubbled through the second medium when it is in its liquid phase. Consequently, use may be made of the latent heat of fusion or melting in the heat exchanging process. The invention has utility in a heating system, such as a residential solar heating system, for example.

According to a more specific object of the invention, the first medium is introduced directly within the second medium by a supply conduit that is submerged at one end beneath the level of the second medium. Furthermore, a submerged imperforate by-pass conduit is provided for conveying the first medium in heat conducting relation through the second when the second medium is in its solid phase, thereby to clog the supply conduit. Thus, the by-pass conduit has inlet and outlet openings arranged above the level of the second medium so that these openings will remain unclogged when the second medium is in its solid phase. In one embodiment, the by-pass conduit includes a tubular portion arranged in concentrically spaced relation about the supply conduit, while in a second embodiment, the by-pass conduit includes a first portion that extends downwardly concentrically within a cylindrical supply receptacle, and a helical second portion that is wound concentrically upwardly about the cylindrical supply receptacle.

The apparatus for the implementation of this method is distinguished by the fact that, in a vessel, there is contained a crystallizable substance and that a fluid medium can be so conducted via conduit means through the vessel that the liquid will come into direct contact with the crystallizable substance.

A further object of the invention is to facilitate the elimination of metallic partitions between the heat-exchanging media by using media that cannot be mixed with each other and by bringing them into direct mutual contact during the heat exchange operation, whereupon the media are then separated from each other. This method is particuarly advantageous in connection with latent heat reservoirs where a preferably liquid medium is brought into direct contact with a crystallizable or eutectic substance.

BRIEF DESCRIPTION OF THE FIGURES

Other objects and advantages of the invention will become apparent from a study of the following specification when viewed in the light of the accompanying drawing, in which:

FIG. 8 is a partly sectioned elevational view of a preferred embodiment of the first medium supply conduit and by-pass conduit means.

DETAILED DESCRIPTION

Figure 1:
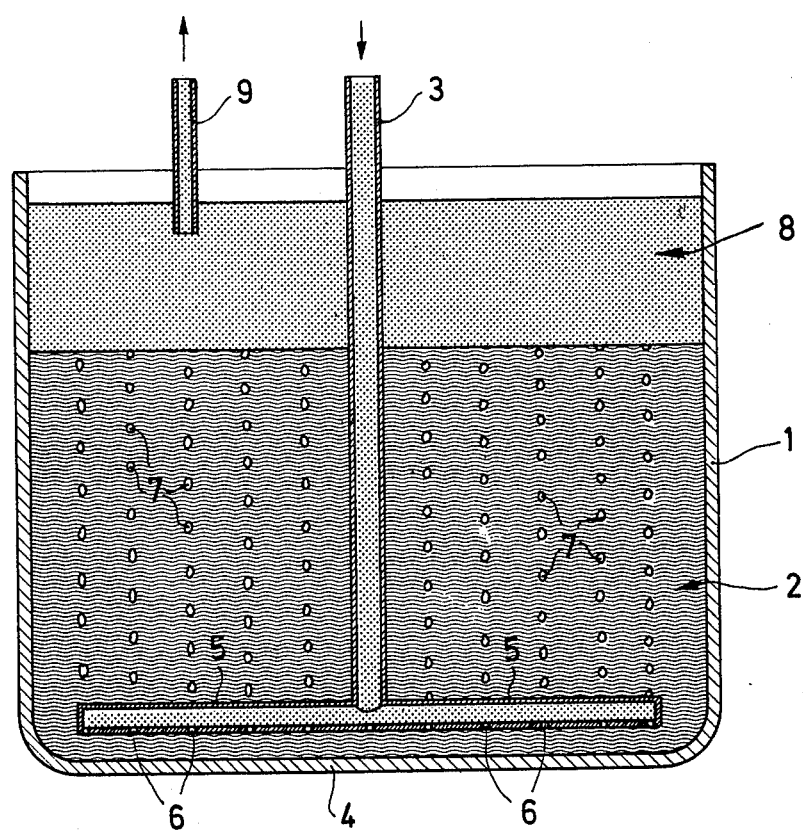
FIG. 1 is a diagrammatic illustration for explaining the basic concepts of the present invention.

Referring first to FIG. 1, a liquid first medium 2, for example, water, is contained in a vessel 1 at a lower first temperature ($t_1$), for instance, 10° C. Into the central portion of vessel 1 there is introduced downwardly a supply conduit 3 which, adjacent the bottom of the vessel 4, is subdivided into several conduit branches 5 extending parallel to the bottom wall of the vessel or, in the alternative, extends in a spiral configuration adjacent and parallel to the bottom. At the underside of branches 5 or the spiral, there are provided a plurality of openings or nozzles 6. Into supply conduit 3 there is supplied a second, preferably likewise liquid medium, for example, a silicon oil or a mineral oil of lesser density than water and having a temperature $t_2$ which is higher than $t_1$. For example, $t_2$ can be 30° C. The important thing is that the second medium, introduced through supply conduit 3 is practically non-mixable with the first medium 2 which is contained in vessel 1. Thus the second medium—which comes out of the nozzles 6 of branches 5 and in the form of small, separate droplets 7 (or possibly also in the form of fine, separate jets)—flows upwardly. Consequently, direct heat exchange is obtained between the two media so that the second medium 8 is accumulated in the cooled state on the surface of the first medium 2, while the first medium 2 remains stationary but is heated to a temperature between $t_1$ and $t_2$. The cooled-off medium 8 can be evacuated again via return conduit 9 and, if necessary, after renewed heating (for example, in a collector for solar energy), it can once again be brought into contact with medium 2 supply conduit means 3, branch conduits 5 and nozzles 6. At any rate, in the methods described, two media, which practically cannot be mixed with each other, are brought into direct mutual contact for the purpose of heat exchange and, after the completion of heat exchange, they are separated from each other once again because of their non-mixability, without the heat exchange here having to take place through metal walls which otherwise would separate the two media from each other.

In FIGS. 2-6, there is illustrated a latent heat reservoir for the application of the method according to the present invention in various operating conditions, whereby in accordance with the present invention once again two heat exchanging media are brought into direct contact with each other. In this case, the first medium 22 contained in the bottom of vessel 21 is a crystalline material (for example, $Na_2SO_4 \cdot 10\ H_2O$) which is operable as a function of temperature between solid and liquid phases. As in FIG. 1, the supply conduit 23 for supplying a fluid second medium 28 extends downwardly into vessel 21 beneath the level of the first medium 22 and is subdivided into horizontal conduit branches 25 that extend parallel to the bottom wall of the vessel. In the alternative, the supply conduit 23 has a bottom portion of spiral configuration that is contained in the horizontal plane. The branch portion 25 contains a plurality of downwardly directed nozzles or apertures 26 through which the second medium is discharged directly into the first medium. A return conduit 29 extends from the upper end of vessel 21 above the level of the first medium 22 (in a manner corresponding to the return conduit 9 of FIG. 1).

Figure 2:
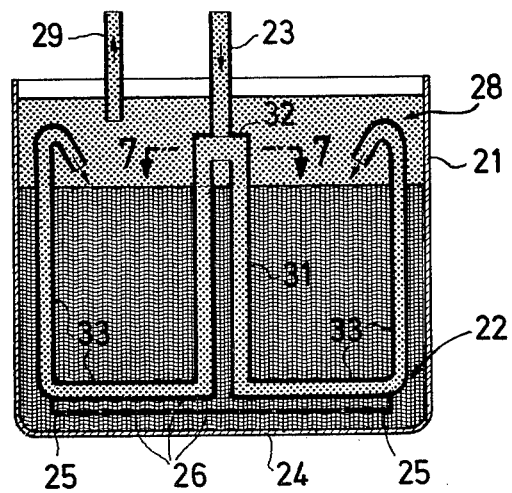
FIGS. 2–4 illustrate the method and apparatus for performing the present invention when the second medium is initially in the solid phase.
Figure 7:
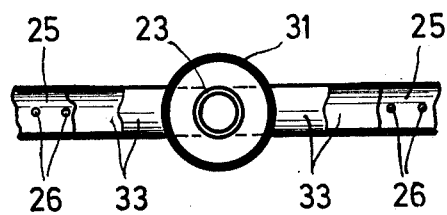
FIG. 7 is a detailed sectional view taken along line 7—7 of FIG. 2.

As illustrated in FIGS. 2 and 7, the lower portion of supply conduit 23 which is submerged within the first medium 22 is concentrically surrounded by a by-pass conduit 31 which extends at its upper end above the surface of the solid medium 22 and is connected with supply conduit 23 via a hood 32. Near the vessel bottom wall 24, branch conduits 33 branch off from the by-pass conduit 31 and these branch conduits are in direct heat conducting contact with supply conduit branch lines 25. At their free ends the by-pass branch conduits 33 extend above the surface of the solid second medium 22 and are so bent that their discharge openings are directed toward the surface of the solid substance 22.

Figure 3:
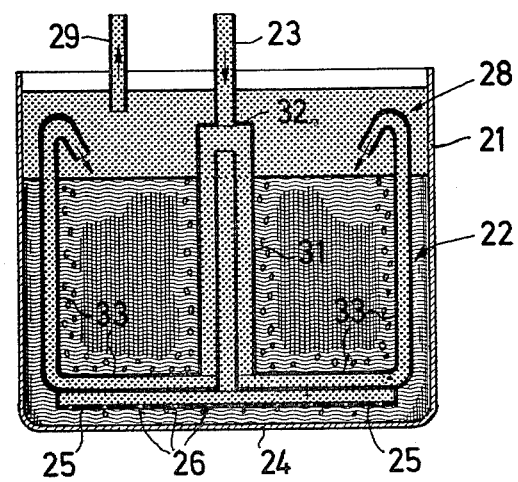

The device described above can be used as latent heat reservoir and operates in the following way. Assume that the solid storage medium 22 in vessel 21 is a crystalline material having a melting point of about 35° C. and at first is kept at a temperature of $T_1 = 20°$ C. (in other words, it is initially in the solid state). The material 22 here is not only present in vessel 21 but also fills the supply conduit 23 and the supply branches 25. The supply conduit 23 is thus, so to speak, "clogged" below the level of the material 22 in vessel 21. Now, if a warm medium, for example, oil at a temperature of $T_2 = 40°$ C. is introduced through supply conduit 23, then it cannot get into the lower part supply conduit 23 and into the branches 25, and consequently it cannot be discharged from the likewise clogged nozzles 26. The warm medium, however, flows through the by-pass conduit 31 into by-pass branches 33 and from there to the surface of the crystallized medium 22. Thus, initially the warmer second medium supplied via conduit 23 is not directly mixed with the cooler first medium. As shown in FIG. 3, the warmer medium first of all melts by heat conduction the solid substance in pipeline 23, in branches 25, and in nozzles 26, and forms melting channels along conduits 31 and 33, whereupon the warmer medium is then free to flow through supply conduit 23 and branches 24 to nozzles 26. The warmer medium then comes into direct contact with the solid medium 22 and progressively melts the latter more and more. The second medium 28, which is supplied through pipeline 23 at about 40° C. is collected on the basis of its lower specific gravity and its non-mixability with material 22 on the surface of the latter, whereupon it can be evacuated at a temperature of about 30° C. via return conduit 29.

Figure 4:
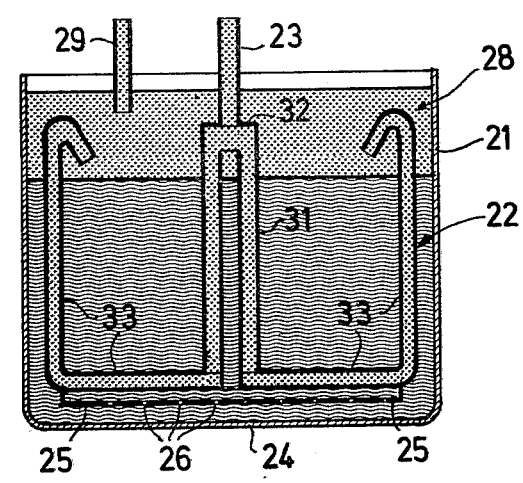

FIG. 4 illustrates the completely melted state of the storage medium 22 which is contained in vessel 21 and which now, for example, has assumed a temperature of about 35° C. (in other words, it has experienced a temperature rise of about 15° C. and, moreover, it has absorbed the latent melting heat energy).

Figure 5:
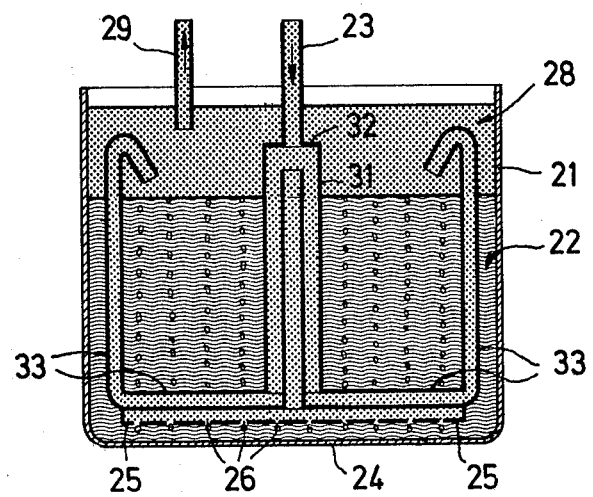
FIGS. 5 and 6 illustrate the operation of the apparatus of FIG. 2 when the second medium is initially in the liquid phase.
Figure 6:
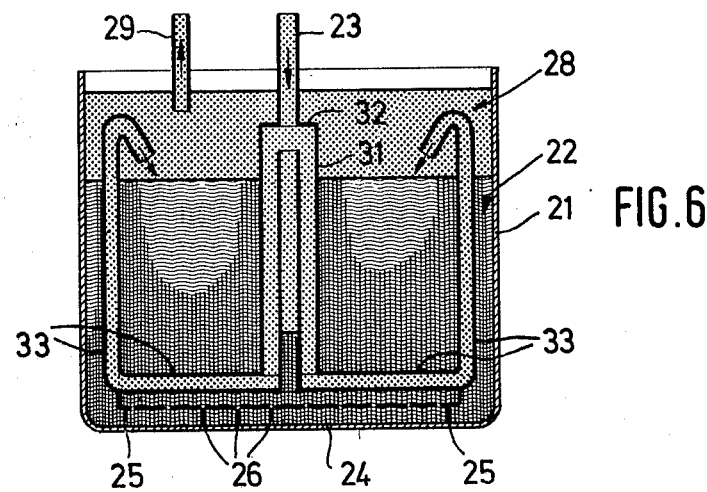

Referring now to FIGS. 5 and 6, the opposite process is illustrated, that is, the process of heat removal from the storage medium 22. In this method of operation, a cold oil (having a temperature of, for instance, 10° C.) is supplied into vessel 22 via supply conduit 23 and nozzle 26 on branch conduits 25. The cold oil flows from the bottom upwardly through the liquid storage medium 22 (which has a temperature of about 35° C.), thereby taking heat away from the latter so that it once again begins to crystallize to the solid phase. The cold oil supplied here is heated up during its direct contact with storage medium 22 to a temperature of, for example, 25° C. and is evacuated from the surface of the storage medium 22 through return conduit 29. FIG. 6 shows the storage medium 22 which has partly solidified again and which now also once again clogs supply conduit 23 as well as branches 25 with nozzles 26. This is why the second medium 28 which is supplied via conduit 23 must be conducted through the by-pass conduit 31 and by-pass branches 33 to the surface of medium 22 until the latter is again completely solidified and until the condition according to FIG. 2 has again been obtained. In the arrangement according to FIG. 2, the conduits 23 and 29 can be connected to a collector for solar energy and the storage medium 22 can serve to store the heat gained from solar energy. In the operation of FIG. 5, conduits 23 and 29 could be connected to a heat pump, whereby the oil, cooled down by the heat pump to a temperature of, for example 10° C., is supplied through supply conduit 23 and whereby the oil, heated for example to 25° C., is once again fed to the heat pump via return conduit 29. The heat pump here can be a part of the building heating system. The above mentioned temperatures, of course, depend on the speed at which the liquid medium 28 flows through the storage medium 22.

FIG. 8 illustrates a preferred second embodiment of a supply conduit for the heat exchange medium. This involves a cylindrical receptacle 41 which can be introduced into container 1 in a perpendicular fashion and which, at its underside, is closed by a bottom wall 42. The bottom portion 43 of the cylindrical receptacle extends into the heat exchange medium and contains apertures or nozzles 44 through which the heat exchanging medium, for example, an oil, can emerge from the interior of the conduit in an essentially radial manner and can then freely pass through the heat storage medium.

The lower portion 43 of the cylindrical receptacle extends concentrically about the by-pass conduit portion 45a which in a sealed manner extends through the bottom wall 42, said by-pass conduit having a helical portion 45b which extends upwardly in heat conducting relation about the outer surface of the receptacle 41. The internal by-pass conduit 45 has an inlet 46 in the interior of conduit 41 and an outlet 47 outside conduit 41. Both the inlet 46 and the outlet 47 lie at a level of receptacle 41 which, during normal operation, does not extend within the heat storage medium, whereby neither inlet 46 nor outlet 47 can be clogged by the solidified heat storage medium.

During operation, the heat exchange medium flows through suppply conduit 48 into receptacle 41 and is discharged through apertures 44 into the heat storage medium.

Owing to the withdrawal of heat from the heat storage medium, the medium gradually assumes its normal solid state, thereby progressively clogging the apertures 44 until finally the heat exchange medium can no longer pass through the apertures 44 into the heat storage medium. The heat exchange medium then flows out through by-pass conduit 45 and its outlet opening 47 and thus comes into contact with the heat storage medium.

When the solidified heat storage medium melts, all the apertures 44 are initially clogged. The heat exchange medium, which enters through supply conduit 48, therefore can come out only through the internal overflow conduit 45. Here it gives off its heat both to the solidified heat storage medium in the interior of the lower conduit area 43 and to the heat storage medium which surrounds conduit 41 and causes the heat storage medium to melt so that the apertures 44, after a short time, are opened for the passage of the heat exchange medium.

The flow resistances of the internal overflow conduit 45 and the size of the nozzles or apertures 44, respectively, are practically so coordinated with each other that the internal by-pass conduit is operable only when practically all nozzles are clogged—something which in practice is the case when the storage unit is completely discharged. This is true with the conduits of FIGS. 2 to 6 as well.

Furthermore, the nozzles or apertures 44 can be so coordinated relative to each other in terms of their diameters and their arrangement along receptacle 41 that in each case generally the lowest, unclogged apertures will be in operation. In addition the flow of the heat exchange medium may be directed such as to pass the lowest apertures prior to the higher ones.

In addition to the previously mentioned sodium sulfate, other salt hydrates are also suitable for use as the heat storage media, e.g. $Na_2HPO_4 \cdot 12H_2O$, $Na_2CO_3 \cdot 10H_2O$, $Na_3PO_4 \cdot 12H_2O$ or correspondingly coordinated eutectics. A nonmineral, paraffin-containing oil would be suitable as the medium which is brought into direct heat exchange with the above mentioned substances. This oil is known in the art and is used in the metalworking industry for the so-called spark erosion of work pieces. The medium which is supplied through supply conduit 23 and which is evacuated through return conduit 29 as a rule is a liquid, but it can also be present in the form of a superheated liquid, steam, or gas.

The following essential advantages, among others, can be achieved by the present invention. In spite of the direct contact of the two heat exchanging media, one medium can at a suitable place—for example, after a calm region, in which swept-along particles of the storage unit substance of a latent heat reservoir can settle—once again be suctioned off and can be heated up or cooled off, depending on whether the storage reservoir is to be charged or discharged at the particular moment. The apparatus for the implementation of the method according to the present invention facilitates simple, sturdy construction without the heat storage containers requiring any special shape and without the need for any expensive metal structures for heat exchange. In the latent heat storage reservoir, the storage medium as a rule is solidified into small particles in their own solution. Latent heat reservoirs can be made gas proof when the method according to the invention is used if the container walls are elastic enough in order to absorb any possibly developing minor volume changes in the solid reservoir substance. In the implementation of the method according to the invention, there are practically no problematical separation phenomena involved in separating a solid storage reservoir substance from metal heat exchanger surfaces. The heat transfer is almost ideal because the through-flowing heat exchanger medium 28 takes care of the corresponding turbulence in the storage medium 22.

While in accordance with the Patent Statutes the preferred forms and embodiments of the invention have been illustrated and described, it will be apparent to those skilled in the art that various changes and modifications may be made without deviating from the inventive concepts set forth above.

What is claimed is:

1. Heat exchanger apparatus for exchanging heat between first and second media having different temperatures, said first medium being a substance operable between liquid and solid phases as a function of temperature, said second medium being a fluid, said first and second media being non-mixable when said first medium is in the liquid phase, which comprises
   (a) a vessel (21) for receiving in its bottom portion said first medium;
   (b) supply conduit means (23, 25, 26; 48, 41, 44) for supplying the second medium directly into said first medium beneath the level thereof, said first and second media having initial temperatures below and above the temperature of fusion of said first medium, respectively; and
   (c) by-pass conduit means (31; 45) for conducting said second medium in sealed relation through said first medium and for discharging said second medium above and immediately adjacent the upper surface of said first medium, whereby in the event said supply conduit means is closed, said second medium is brought into contact with said first medium via said by-pass conduit means.

2. Apparatus as defined in claim 1, wherein said by-pass conduit means is arranged adjacent said supply conduit means for effecting a phase reversal of the first media in the vessel as well as any portion of the first media contained in said supply conduit means.

3. Apparatus as defined in claim 2, wherein said supply conduit means includes a cylindrical receptacle (41) which is adapted to extend downwardly into the first medium, the lower portion (43) of said cylindrical receptacle containing apertures (44) for discharging said second medium radially outwardly into said first medium; said by-pass conduit means including a first portion (45a) that extends downwardly in concentrically spaced relation within said tubular receptacle and through the bottom portion thereof, and a second portion (45b) that extends upwardly adjacent the outer surface of said cylindrical receptacle, said by-pass conduit first portion having an inlet opening (46) arranged above the level of said second medium, said by-pass conduit second portion having a discharge opening (47) also arranged above the level of said second medium.

4. Apparatus as defined in claim 3, wherein said by-pass conduit second portion is in continguous heat-conducting relation relative to the outer surface of said cylindrical receptacle.

5. Apparatus as defined in claim 4, wherein said by-pass conduit second portion is wound helically about the outer surface of said cylindrical receptacle.

6. Apparatus as defined in claim 2, wherein the size of the apertures in said cylindrical receptacle is such relative to the flow resistance of said by-pass conduit means that said by-pass conduit means became operable only when substantially all of said apertures are clogged by said first media when in the solid phase.

7. Apparatus as defined in claim 2, wherein said apertures have such relative size and are so arranged in said cylindrical receptacle that substantially only the lowest nonclogged apertures are in operation at any given time.

8. Apparatus as defined in claim 10, wherein said cylindrical receptacle has a bottom wall (42) through which said internal by-pass conduit extends.

9. Apparatus as defined in claim 2, wherein the flow of the heat exchange medium is directed such as to reach the lowest apertures prior to the higher ones.

* * * * *